United States Patent
Hinque et al.

(10) Patent No.: US 9,193,226 B2
(45) Date of Patent: Nov. 24, 2015

(54) COMPRESSOR FOR A SELF-INFLATING PNEUMATIC TIRE

(71) Applicant: The Goodyear Tire & Rubber Company, Akron, OH (US)

(72) Inventors: Daniel Paul Luc Marie Hinque, Habay-la-Neuve (BE); William Alain Talbot, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 231 days.

(21) Appl. No.: 14/100,149

(22) Filed: Dec. 9, 2013

(65) Prior Publication Data

US 2015/0158349 A1    Jun. 11, 2015

(51) Int. Cl.
*B60C 23/12*    (2006.01)
*F04B 9/02*     (2006.01)
*B60C 29/00*    (2006.01)

(52) U.S. Cl.
CPC ............. *B60C 23/12* (2013.01); *B60C 29/00* (2013.01); *F04B 9/02* (2013.01)

(58) Field of Classification Search
CPC ........ B60C 23/12; B60C 29/00; B60C 29/04; F04B 9/02
USPC .......................................... 152/415–419, 429
See application file for complete search history.

(56) References Cited

U.S. PATENT DOCUMENTS

| | | | | |
|---|---|---|---|---|
| 5,355,924 A * | 10/1994 | Olney | ............ | B60C 23/12 152/418 |
| 5,556,489 A * | 9/1996 | Curlett | ............ | B60C 23/12 152/418 |
| 7,051,778 B2 * | 5/2006 | Mancosu | ............ | B60C 23/12 152/419 |
| 7,237,590 B2 * | 7/2007 | Loewe | ............ | B60C 23/004 152/418 |
| 7,322,392 B2 * | 1/2008 | Hawes | ............ | B60C 23/12 152/418 |
| 8,820,376 B2 * | 9/2014 | Bormann | ............ | B60C 23/12 152/418 |
| 2004/0016492 A1 * | 1/2004 | Moore | ............ | B60C 23/12 152/418 |
| 2004/0216827 A1 * | 11/2004 | Stanczak | ............ | B60C 23/12 152/419 |
| 2006/0102268 A1 * | 5/2006 | Loewe | ............ | B60C 23/004 152/415 |
| 2012/0160386 A1 | 6/2012 | Hinque et al. | | |

FOREIGN PATENT DOCUMENTS

JP      2004330820      11/2004
WO      2010141638      12/2010

* cited by examiner

*Primary Examiner* — S. Joseph Morano
*Assistant Examiner* — Jean Charleston
(74) *Attorney, Agent, or Firm* — David L. King

(57) ABSTRACT

The invention relates to an air compressor mountable in an annular tire cavity of a pneumatic tire. The compressor comprises an air inlet, an air outlet, and a body in which are formed a blind hole having a sidewall and a compression chamber in fluid communication with the air inlet and the air outlet. Further, the tire comprises a compression piston configured for reciprocating in the compression chamber for providing compressed air to the tire cavity through the air outlet, and a hydraulic fluid passage for providing hydraulic fluid into the blind hole, as well as a guiding piston configured for reciprocating in the blind hole in sealed contact with the sidewall and for guiding a reciprocating movement of the body relative to the compression piston. The invention further relates to a tire assembly comprising a tire and the compressor.

22 Claims, 4 Drawing Sheets

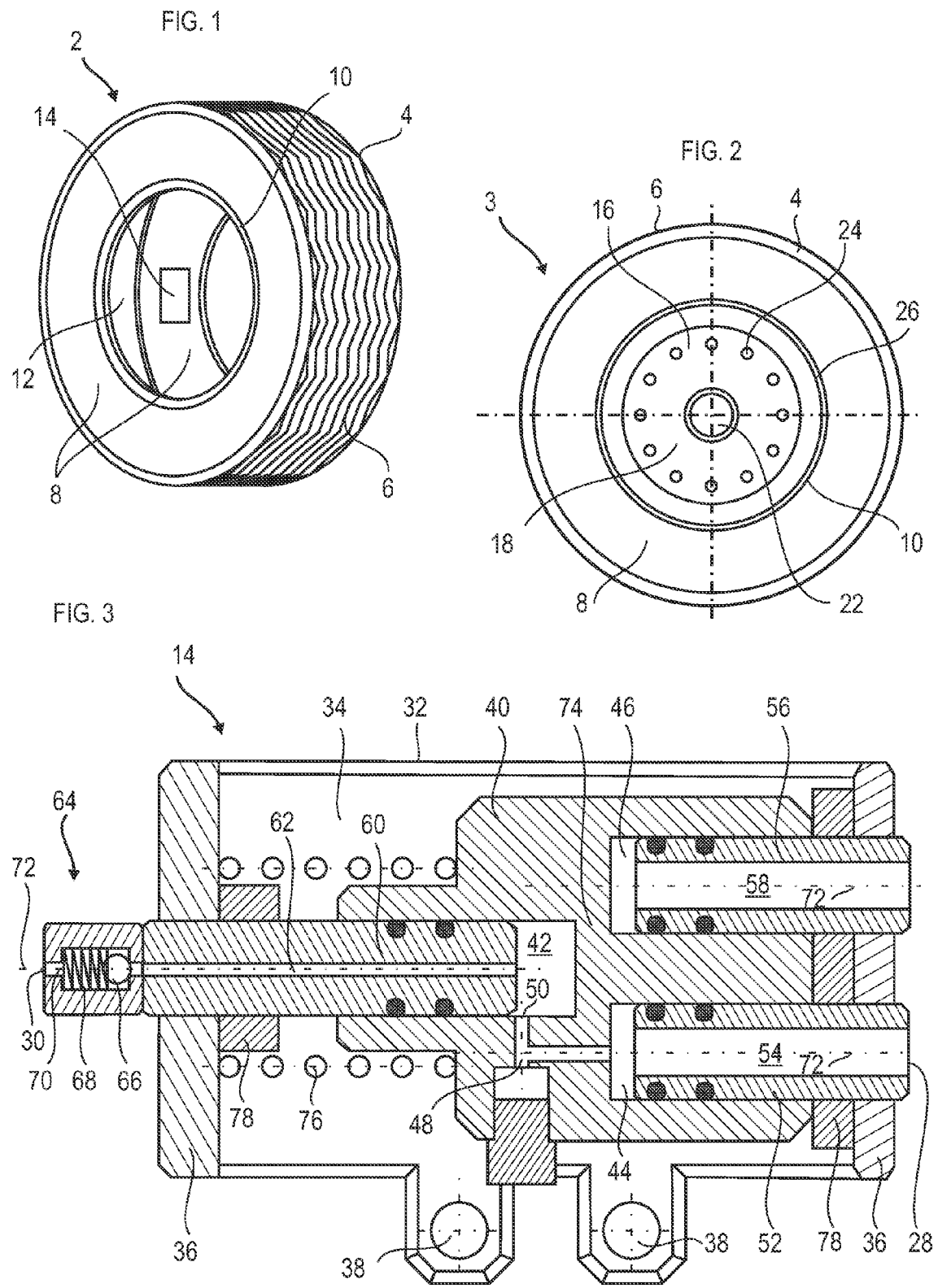

COMPRESSOR FOR A SELF-INFLATING PNEUMATIC TIRE

TECHNICAL FIELD

The invention relates to a compressor mountable in an annular tire cavity for inflating a pneumatic tire. The invention relates also to a pneumatic tire comprising a compressor according to the invention. The invention may also relate to a tire assembly comprising a compressor and at least one of a rim, a tire, and a hydraulic actuator for driving the compressor.

PRIOR ART

In order to increase their safety, vehicles may be provided with self-inflating tires. Such tires shall be able to maintain a desired tire cavity pressure in an autonomous manner. For example, such tires may comprise pumps actuated by the tire's periodical deformation when the tire is rolling over the ground, wherein the pumps may compress air from the environment and expel it into the tire cavity.

Document US 2012/0160386 A1 discloses a self inflating tire comprising a pump assembly and a compression actuator assembly. The pump assembly comprises a main body with an axial chamber in which two pistons reciprocate. They delimit a compression room that translates when the pistons reciprocate. The first piston is activated by the compression actuator assembly. The second piston comprises a shaft that engages the first piston in a cavity. Unfortunately, leaks may occur at the interface between the cavity and the shaft, and may thus reduce the pump's efficiency and yield. In particular, the yield of the pump relies on the surface roughness of the cavity and the shaft. Consequently, production costs may be elevated, all the more so due to the pump's small size for insertion through the thickness of the tire's sidewall. The maximal pressure the pump may provide is also limited.

It is one object of the present invention to overcome at least one of the afore-mentioned disadvantages. Another object of the present invention may consist in improving the efficiency of a compressor for inflating a tire. A further object of the invention may consist in increasing the maximal pressure provided by a compressor.

SUMMARY OF THE INVENTION

A compressor mountable in an annular tire cavity, as for instance to the tire's sidewall, comprises an air inlet, an air outlet, and a body in which are formed a blind hole having a sidewall, and a compression chamber in fluid communication with the air inlet and the air outlet. Further, the compressor comprises a compression piston configured for reciprocating in the compression chamber for providing compressed air to the tire cavity through the air outlet, and a hydraulic fluid passage for providing hydraulic fluid into the blind hole, as well as a guiding piston or rod configured for reciprocating in the blind hole in sealed contact with the sidewall and for guiding a reciprocating movement of the body relative to the compression piston.

According to a first aspect, the body comprises a wall tightly separating the compression chamber and the blind hole.

According to another aspect, the compression piston and the guiding piston extend in parallel directions such that the body is moved relatively and in parallel to the compression piston and the guiding piston upon actuation by hydraulic fluid pressure provided to the blind hole.

According to another aspect, the compression piston and the guiding piston are rigidly fixed relative to each other, and the body is movable relatively to the compression piston and the guiding piston.

According to another aspect, the compressor comprises a support to be mounted to the tire, the compression piston and the guiding piston being rigidly fixed to the support and the body being moveable in relation to the support. For example, the support may be mounted to the tire or the tire's sidewall by a screwed or glued connection.

According to another aspect, the compression piston may extend in the compression chamber along or over a longer portion than the guiding piston may extend in the blind hole.

According to another aspect, the body is arranged and configured to move between a compression state and a decompression or intake state relative to the compression piston.

According to another aspect, the compressor comprises two damping plates disposed at opposing faces of the body in relation to the direction of the reciprocating movement to damp the body abutting the support when reciprocating between the compression state and the decompressed state.

According to another aspect, the compression piston and the guiding piston are movable along two different parallel axes offset from each other.

According to another aspect, the body comprises an inlet chamber, and a pipe in fluid communication with the air inlet and being configured for reciprocating in the inlet chamber.

According to another aspect, the pipe has an elongated shape, elongated in parallel to the direction of reciprocating movement of the guiding piston and/or of the compression piston. Further, the pipe may have two opposed ends and may comprise a through hole connecting both ends.

According to another aspect, the inlet chamber and the compression chamber are in fluid communication through a passageway.

According to another aspect, the compression chamber has a shape of a bore with a bottom, a sidewall and an opening, wherein the passageway forms an aperture on the sidewall which is remotely disposed from the bottom or disposed between the bottom and the opening.

According to another aspect, the body is arranged and configured to move between a compression state and a decompression or intake state relative to the compression piston, wherein the pipe may be elongated in respect of the direction of reciprocating movement and may comprise a through hole connecting its two axially opposed faces. The inlet chamber and the compression chamber may be in fluid communication through a passageway, wherein in the decompression state, the passageway is in fluid communication with the compression chamber, and in the compression state, the compression piston blocks fluid communication between the passageway and the compression chamber.

According to another aspect, the compression piston comprises a through hole connecting its two axially opposite faces or ends, and, optionally, a check valve in fluid communication with the through hole.

According to another aspect, the volume of the through hole of the compression piston is inferior to the half of the maximal free volume in the compression chamber during the compression piston's reciprocating movement.

According to another aspect, the compressor comprises a spring opposing or biasing a compression movement of the compression piston within the compression chamber.

According to another aspect, the compression piston and the guiding piston and/or the blind hole and the compression chamber cover the majority of the body in respect of the direction of the reciprocating movement.

According to another aspect, the hydraulic fluid passage is formed in the guiding piston and connects two axially opposite faces of the guiding piston.

According to another aspect, the hydraulic fluid passage is formed in the body.

According to another aspect, the guiding piston is configured for reciprocating in the blind hole in sealed contact with the sidewall and for guiding a reciprocating movement of the body relative to the compression piston upon cyclically or periodically providing hydraulic fluid or hydraulic fluid pressure to the blind hole via the hydraulic fluid passage. Hydraulic fluid or fluid pressure may be cyclically or periodically provided to the hydraulic fluid passage via a hydraulic actuator. Such an actuator or engine may be driven by the cyclical or periodic deformation of the tire's sidewall or another portion of the tire periodically deforming when the tire is rolling.

According to another aspect, the support is a frame which may have a plurality of rigid struts.

According to another aspect, the volume of the through hole of the compression piston is inferior to the tenth of the maximal free volume of the compression chamber available during the compression piston's reciprocating movement.

According to yet another aspect, the body is fixed to the tire and the support is movable relative to the tire and the body.

The invention also relates to a tire assembly comprising a tire having a tire cavity and the aforementioned compressor.

According to an aspect, the tire assembly comprises an actuating mechanism or hydraulic actuator in hydraulic fluid communication with the blind hole.

According to another aspect, the tire comprises a sidewall with the compressor being mounted inside the tire cavity to the sidewall.

According to yet another aspect, the through hole of the compression piston is in fluid communication with the annular tire cavity of the tire assembly.

According to yet another aspect, the assembly further comprises a pipe or tube connecting the air inlet of the compressor with a through hole in the tire's sidewall for allowing fluid communication of the air inlet with the tire's (outer) environment.

According to yet another aspect, the hydraulic actuator or pump is mounted on the tire, and the compressor is mounted on the rim. In general, the actuator and the compressor may be connected via a tube for conducting hydraulic fluid.

According to yet another aspect, the hydraulic actuator may comprise a flexible or deformable bag or reservoir for holding a hydraulic fluid. The bag may be mounted to the tire's sidewall and may be deformed by the cyclical or periodical deflection of the sidewall upon the tire's rotation.

According to a further aspect, the body is subject to tire cavity pressure or in direct fluid communication with the tire cavity.

The invention may also relate to a method for inflating or pumping air into a tire via a compressor in accordance with the present invention.

In an aspect, the method may comprise the step of periodically or cyclically providing hydraulic fluid or hydraulic fluid pressure to the compressor, in particular to the blind hole, via the hydraulic fluid passage.

In another aspect, the method may comprise the step of periodically or cyclically providing hydraulic fluid or hydraulic fluid pressure to the compressor, in particular to the blind hole, via the hydraulic fluid passage by means of a hydraulic actuator.

In another aspect, the method may comprise the step of periodically or cyclically providing hydraulic fluid or hydraulic fluid pressure to the compressor, in particular to the blind hole, via the hydraulic fluid passage by means of a hydraulic actuator driven by the periodic or cyclic rotation of the tire.

In another aspect, the actuator or engine may be mounted to the tire's sidewall deflecting or deforming upon rotation of the tire. As described above, the actuator may comprise a flexible hydraulic fluid reservoir or bag cyclically or periodically deforming upon rotation of the tire. The reservoir may have an opening and/or nozzle in fluid communication with the compressor's hydraulic fluid passage, as for instance via a tube.

Any of the above mentioned features may be combined with or replaced by one another.

DEFINITIONS

"Axial" and "axially" mean lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial Plane" means the plane perpendicular to the tire's axis of rotation and passing through the center of the tread.

"Groove" means an elongated void area in a tire wall that may extend circumferentially or laterally about the tire wall. The "groove width" may be equal to its average width over its length.

"Peristaltic" means operating by means of wave-like contractions that propel contained matter, such as air, along tubular pathways.

"Radial" and "radially" mean directions radially toward or away from the axis of rotation of the tire.

"Sidewall" means that portion of a tire between the tread and the bead.

"Tread" means a rubber component which when bonded to a tire carcass includes that portion of the tire that comes into contact with the road when the tire is normally inflated and under normal load.

BRIEF DESCRIPTION OF THE DRAWINGS

FIG. 1 is a perspective view of a tire assembly according to an embodiment of the invention with a compressor and a tire.

FIG. 2 is a plan view of a tire assembly according to another embodiment of the invention, the tire being mounted on a rim.

FIG. 3 is a cross sectional view of a compressor according to an embodiment of the invention, the compressor being in an intake state.

DETAILED DESCRIPTION OF THE INVENTION

Figure 4:
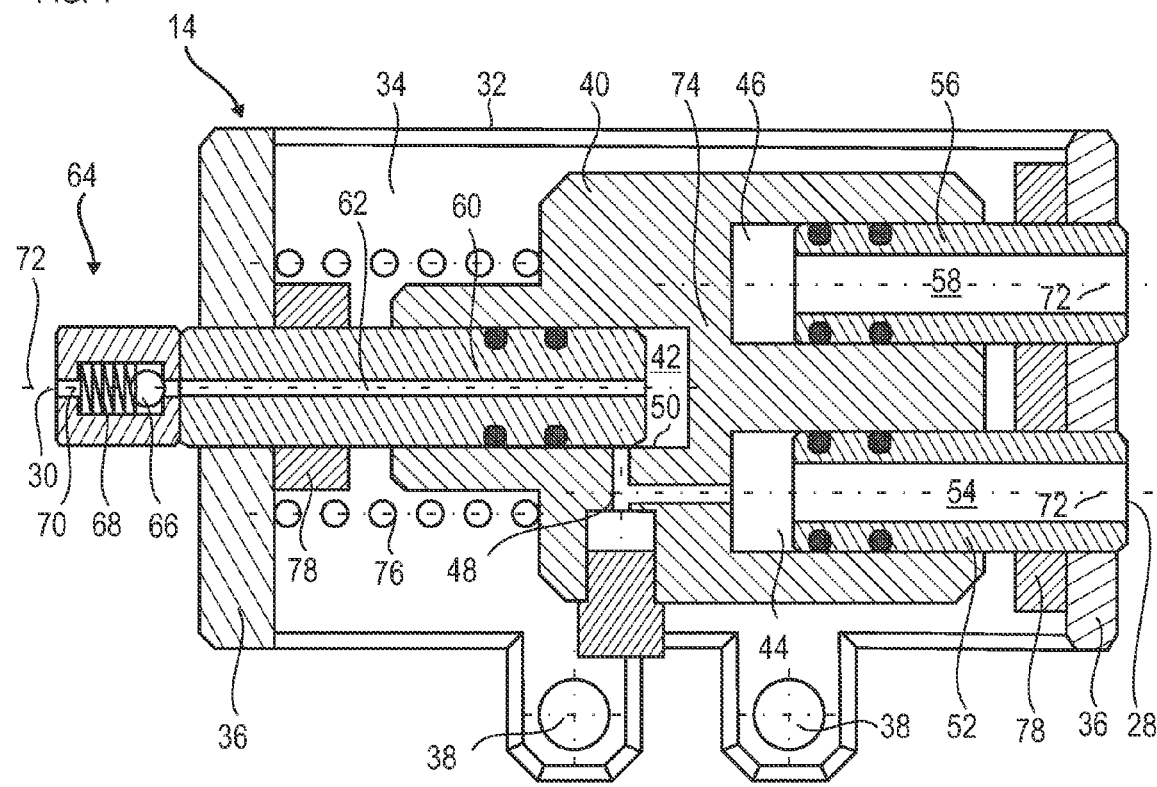
FIG. 4 is a cross sectional view of the compressor according to the embodiment of FIG. 3 in a first compression intermediate.

FIG. 1 represents a perspective view of a tire assembly 2 according to a first embodiment of the invention.

The tire assembly 2 comprises a tire 4 with a carcass (not shown), a tread portion 6 having an annular shape, two lateral sidewalls 8 and two annular beads 10 at the radially inner extremity of each sidewall 8. Each sidewall 8 has an annular shape with a central opening delimited by one of the beads 10. Further, the tire 4 defines an annular cavity 12 which is delimited by its tread portion 6, its sidewalls 8 and eventually its beads 10.

The tire assembly 2 also comprises a compressor 14 for injecting or pumping compressed air into the annular cavity of the tire 4. The compressor 14 is mounted in the annular cavity 12. Preferably, it is mounted on a sidewall 8. For pumping air into the tire 4, the compressor 14 may be activated by the cyclic deformation of the tire 4 and/or the tire's sidewall 8 against the ground when it runs. In general, the tire assembly 2 may form a self-inflating tire assembly. In particular, the compressor 14 may be activated by an actuating mechanism (not represented), as for instance by a hydraulic actuator or pump. The actuator may be mounted on a rim, on a hub, or on the tire 4, wherein the actuator may provide a hydraulic fluid, whose hydraulic pressure fluctuates upon rotation of the tire assembly 2. In particular, the hydraulic fluid may be an incompressible fluid as for instance water or oil.

A hydraulic actuator is for example known from US 2012/0160386 A1 which provides an actuating medium for actuating a compressor by means of the bending of the tire's sidewall 8. The subject-matter of that application is incorporated into the present application by reference.

FIG. 2 represents an axial view of a tire assembly 3 according to another embodiment of the invention, wherein elements equal to those already shown in FIG. 1 are described by equal reference numerals.

The tire assembly 3 may comprise a rim 16 on which is mounted the tire 4. In particular, the tire assembly 3 may be a wheel which may be mounted on a vehicle. The rim 16 may have a circular shape, with a disc portion 18 and an annular portion surrounding the disc portion 18. The disc portion 18 may comprise a central hole 22 which may be mounted on a hub of a vehicle. It may also comprise a set of fixing holes 24. The annular portion may comprise two annular flanges 26 which extend in a radial outer direction and which are disposed at each axial extremity of the rim 16. The beads 10 of the tire 4 are in contact with the annular flanges 26 of the annular portion and the flanges 26 are arranged for axially retaining the tire 4, particularly its beads 10.

The annular cavity 12 of the tire 4 is closed by the rim 16, eventually by its cylindrical portion. Further, the tire assembly 3 may comprise a valve (not represented) for inflating the tire 4 by known means.

In particular, a tire assembly 3 may comprise a compressor 14 arranged within the tire cavity (not visible in the plan view of FIG. 2).

FIG. 3 represents an air compressor 14 according to an embodiment of the invention, in which the compressor is represented in a decompressed or, in other words, in an intake state.

The air compressor 14 comprises an air inlet 28 and an air outlet 30. The air inlet 28 is in fluid communication with the tire's environment, which may be substantially at the atmospheric pressure. The air inlet 28 may comprise or may be connected to a channel which passes through a sidewall 8. The provision of such a channel is known in the prior art and is for instance disclosed in U.S. Pat. No. 8,156,978 B1 which is also incorporated herein by reference. The air outlet 30 is in fluid communication with the annular cavity of the tire which may be at the inflating pressure.

Further, the compressor 14 preferably comprises a support 32 which may be a frame. In other words, the support 32 may form a hollow box or enclosure, which may have one or more open sides. Further, the support 32 may have an elongated shape which may extend in a longitudinal direction and which may comprise a mounting plate 34 which may be in contact with the sidewall 8 when the compressor 14 is mounted on the tire. The mounting plate 34 may be adapted to the shape of the inner surface of the sidewall 8 at its mounting position. Further, the support 32 may comprise two essentially parallel plates 36 extending perpendicularly from the main plate 34 and perpendicular to the elongated shape. In other words, the plates 36 may extend in a direction perpendicular or transversal to the longitudinal direction.

The compressor 14, or especially the support 32, may comprise fixation means like holes or seats 38 for mounting the compressor 14 via screws to the tire. In particular, the fixation means may be provided on the mounting plate 34.

The compressor 14 further comprises a body 40 disposed between the parallel plates 36 or, in other words, within the frame. In particular, the body 40 forms a block of material and is movable along the longitudinal direction of the elongated support 32, for instance along a straight line. Thus, the body 40 may reciprocate relative to the support 32 in order to provide compressed fluid. According to an alternative embodiment of the invention, the body may be fixed to the tire and the support may be movable relative to the tire and the body 40.

According to the depicted embodiment, the body 40 comprises a compression chamber 42, an inlet chamber 44, and a blind hole 46. The compression chamber 42 is in fluid communication with the air outlet 30 and also with the inlet chamber 44 of the compressor 14. Each chamber and the blind hole 46 may form a bore or blind bore extending into the body 40. Each bore may have a cylindrical shape and/or a bottom, an opening and a sidewall extending between them. In general, the chambers and the blind hole 46 may extend in parallel directions.

The body 40 may have an elongated shape and two ends, wherein a first half of the body extends from the first end, essentially in parallel to the body's elongated shape and comprises at least a major part of the compression chamber 42. A second half of the body 40 extends, essentially in parallel to the body's elongated shape, from the second end and comprises at least a major part of the inlet chamber 44, if any, as well as at least a major part of the blind hole 46. The chambers and the blind hole 46 extend essentially in parallel to the body's or the support's elongated shape or, in other words, in parallel to the longitudinal direction. The compression chamber 42 may overlap with the inlet chamber 44 and/or the blind hole 46 with respect to the longitudinal direction. However, both chambers 42, 44 are tightly separated from each other. The openings of the inlet chamber 44 and of the blind hole 46 are preferably provided at a face of the body 40 opposite to the face of the body 40 comprising the opening of the compression chamber 42.

The inlet chamber 44 and the compression chamber 42 are in fluid communication with each other, preferably through a passageway 48, wherein the passageway 48 may extend from the bottom of the inlet chamber 44 to the sidewall of the compression chamber 42 and may form an aperture 50 on the compression chamber's sidewall.

The compression chamber 42 may comprise a bottom half and an opening half, wherein the aperture 50 is preferably disposed in the bottom half. In particular, the aperture 50 may be disposed remote from the bottom of the compression chamber 42. A higher distance of the aperture 50 from the bottom of the compression chamber 42 results in a higher compression ratio and a larger volume of compressed air provided at each compression stroke.

The compressor 14 may further comprise a pipe 52 which is rigidly fixed to the support 32, preferably to a plate 36. The pipe 52 comprises a through hole 54 in fluid communication with the air inlet 28. Further, the pipe 52 extends inside the inlet chamber 44 and may reciprocate relatively to the chamber 44 when the compressor body 40 moves relatively to the support 32. In particular, it comprises an outer surface which slides along and/or is guided by the inlet chamber's sidewall. In addition, the pipe 52 and/or the inlet chamber's sidewall may comprise at least one sealing element, as for instance O-ring seals.

The compressor 14 further comprises a guiding piston 56. The guiding piston 56 is rigidly fixed to the support 32, preferably to a plate 36, as for instance to the same plate 36 which receives or holds the pipe 52. The guiding piston 56 extends inside the blind hole 46 and may reciprocate relatively to the blind hole 46 when the compressor body 40 moves relatively to the support 32. It comprises an outer sliding surface which is guided by the blind hole's sidewall. This interface between the sidewall and the guiding piston 56 may be sealed by one or more sealing members. In particular, the guiding piston 56 and/or the sidewall of the blind hole 46 may comprise O-ring seals.

The compressor 14 comprises also a hydraulic fluid passage 58 or through hole which may be in fluid communication with the bottom of the blind hole 46. Further, the hydraulic fluid passage 58 may be in fluid communication with the end of the guiding piston 56 which reciprocates in the blind hole 46. In particular, the hydraulic fluid passage 58 may provide hydraulic fluid pressure or fluid from a hydraulic actuator to the blind hole 46. A cyclic or periodic variation of hydraulic fluid pressure, may permit to drive the body 40 in a reciprocating movement.

The compressor 14 further comprises a compression piston 60. The compression piston 60 extends in the compression chamber 42 and may reciprocate relatively to that chamber when the compressor body 40 moves relatively to the support 32. In the depicted embodiment, the compression piston 60 is rigidly fixed to the support 32, preferably to a plate 36, and more preferably also relative to the plate 36 which receives or holds the pipe 52. Further, the compression piston 60 may comprise a sliding surface which is guide by compression chamber's sidewall. The compression piston 60 and/or the compression chamber's sidewall may comprise at least one sealing member as for instance an O-ring seals. When the compression piston 60 reciprocates, it closes and opens progressively the aperture 50. The compression piston 60 comprises a through hole 62 connecting its both ends. This through hole 62 is in fluid communication with the air outlet 30 of the compressor 14. Preferably, the compression piston 60 also comprises a check valve 64 in fluid communication with its through hole 62. In general, a check valve 64 is provided for preventing pressurized air in the tire cavity to escape through the compressor. For instance, the check valve 64 may comprise a ball 66, a spring 68 and a duct 70 and may be disposed in the compression piston 60. The check valve 64 may be a part of the through hole of the compression piston 60, or may be disposed in an additional member.

The support 32, the body 40, the compression piston 60, the guiding piston 56, and the pipe 52 may be made of metal, as for instance aluminum, rubber or plastics. They may be molded or machined.

Still referring to FIG. 3, the compression chamber 42 and the blind hole 46 are tightly separated by a wall 74. This feature prevents any leakage between them. On the one hand, it prevents a direct flow of the hydraulic fluid from the blind hole 46 into the compression chamber 42. On the other hand, it prevents (direct) air flow from the compression chamber 42 into the blind hole 46. Hence, the compressor 14 has a high efficiency and may achieve high compression ratios.

As further depicted in FIGS. 3 to 9, the compressor 14 may comprise a spring 76 being disposed between the body 40 and the support 32. In particular, the spring 76 may assist in returning the body 40 back to the decompressed state. However, the spring 76 does not constitute an essential element of the compressor 14 since the body 40 might also be moved back into the decompressed state by a cyclic hydraulic pressure drop in the blind hole 46.

The compressor 14 may further comprise a damping plate 78, or, preferably, two damping plates 78 which are mounted inside the support 32. Each of them is mounted in parallel to a plate 36 extending perpendicularly from the mounting plate 34 for damping the body's stroke. Preferably, a damping plate 78 may comprise an elastomeric material.

In the decompressed or intake state, the air inlet 28 and the through hole 62 of the compression piston 60 are in fluid communication via the through hole 54 of the pipe 52, the inlet chamber 44, the passageway 48, and the compression chamber 42 since the aperture 50 remains open.

FIG. 4 represents the compressor 14 according to FIG. 3 in a first compression intermediate state. According to FIG. 4, the body 40 has started to move relative to the support 32 and the compression piston 60 covers the aperture 50 in the compression chamber 42. Since the sliding surfaces of the compression piston 60 and the compression chamber 42 are sealed between each other, the compression piston 60 blocks fluid communication through the aperture 50. Thereby, the compression piston 60 may close fluid communication between the air inlet 28 and the air outlet 30 through the compression chamber 42.

Nevertheless, air may escape via the through hole 62 of the compression piston 60, provided its pressure is high enough to open the check valve 64. If a spring 68 of the check valve 64 is not pre-loaded, air will escape at the beginning of the compression movement of the compression piston 60. On the contrary, if a spring 68 of the check valve 64 is pre-loaded, the check valve 64 will open at a later stage as it will be explained in the forthcoming paragraphs.

Figure 5:
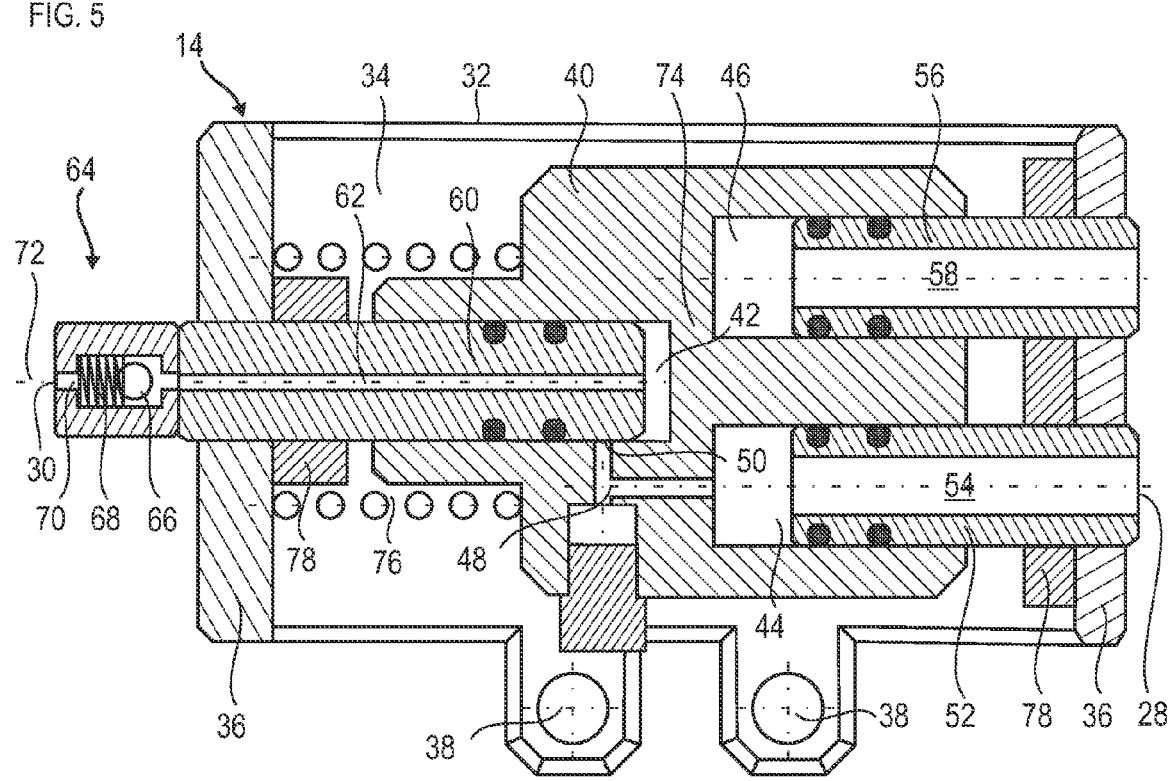
FIG. 5 is a cross sectional view of the compressor according to the embodiment of FIGS. 3 and 4 in a second compression intermediate state.

FIG. 5 illustrates the above described compressor 14 in a second and later compression intermediate state.

The body 40 moves further toward the (full) compression state relative to the support 32. Since the compression piston 60 still closes the aperture 50, the air contained in the closed cavity is further compressed. At one point, its pressure reaches a threshold which triggers the check valve opening. This threshold depends on the check valve's spring pre-load and on the pressure in the annular enclosure of the tire assembly. Compressed air is injected in the annular tire cavity and inflates the tire.

Figure 6:
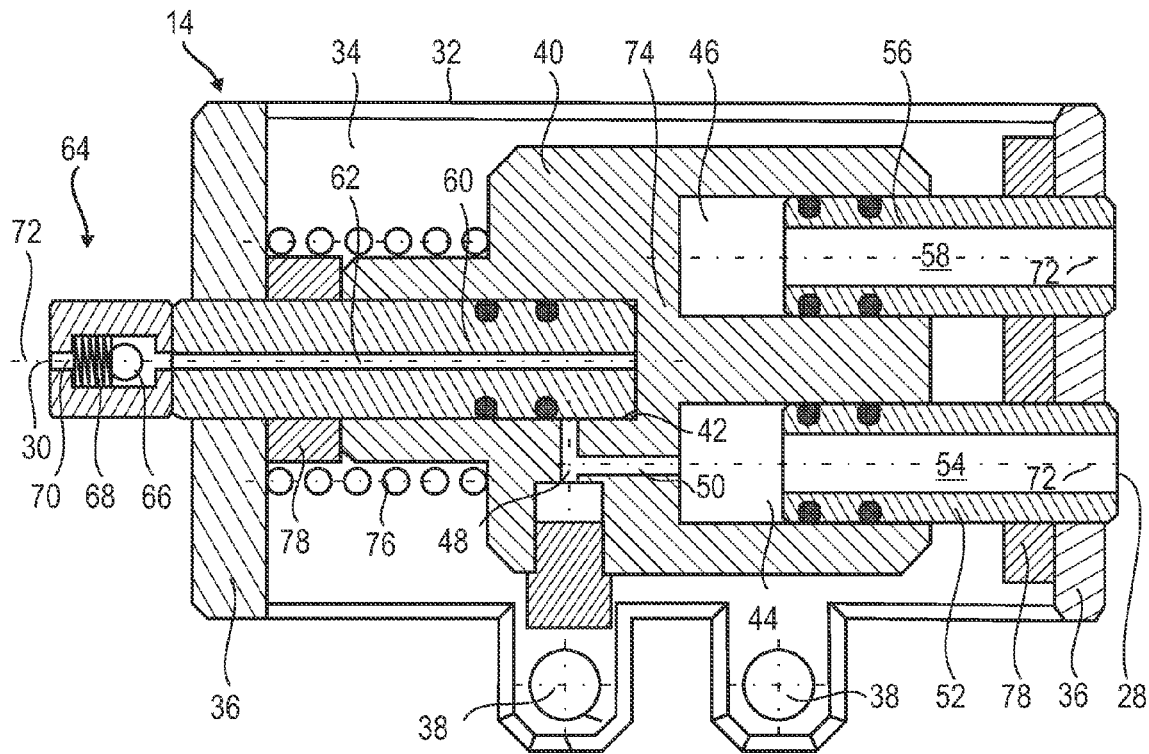
FIG. 6 is a cross sectional view of the compressor according to the embodiment of FIGS. 3 to 5 in the compression state.

FIG. 6 shows the compressor 14 in the compression state in which the body 40 contacts a damping plate 78. During compression of the damping plate 78, compressed air is still provided to the tire cavity. The compressed air exits the closed chamber through the piston's check valve 64 which remains open. In that state, the compression piston 60 essentially extends over the whole length of the compression chamber 42, wherein the free end of the compression piston 60 is close to the bottom of the compression chamber 42. The gap between the free end and the bottom may be inferior to 1 mm, preferably inferior to 0.2 mm. After the body 40 has reached the compression state, it returns to the intake or intake state and continues to reciprocate.

Figure 7:
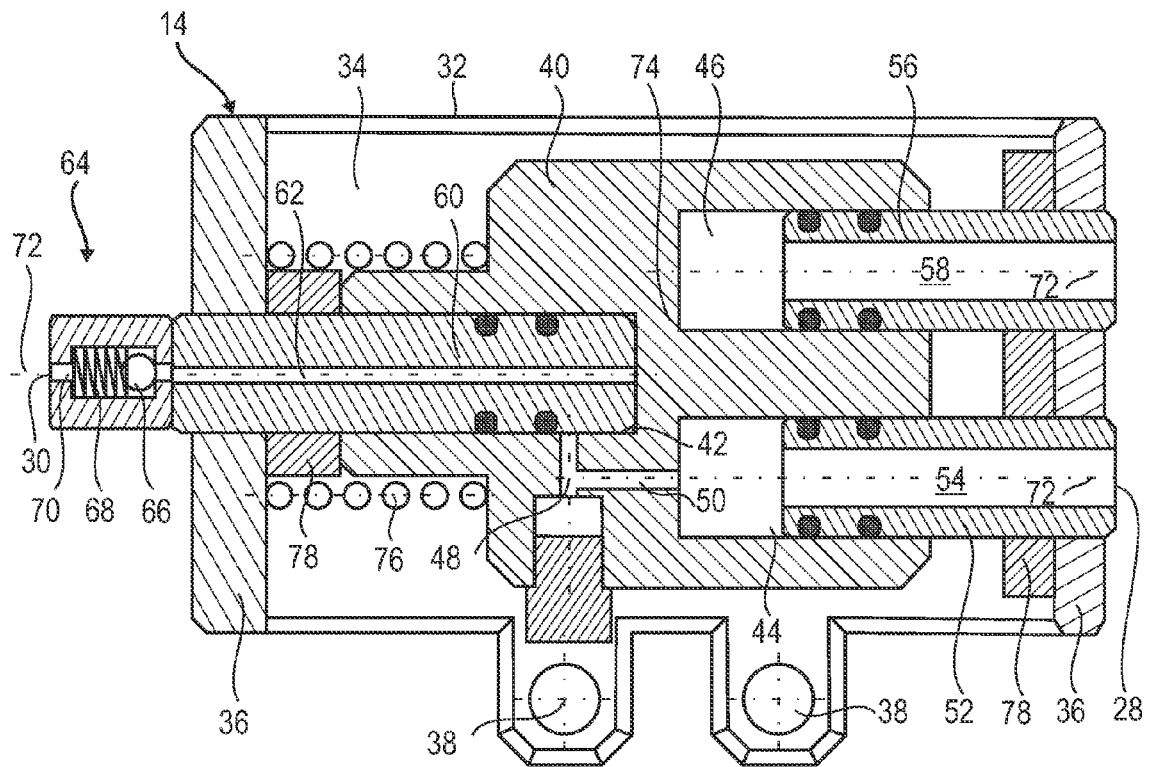
FIG. 7 is a cross sectional view of the compressor according to the embodiment of FIGS. 3 to 6 in a state subsequent the compression state and before the intake state.

FIG. 7 illustrates the compressor 14 in a state subsequent the compression state but prior to the intake state. When the compressed air flows into the tire cavity, the pressure of the remaining compressed air in the through hole of the piston 60 decreases. It decreases until it reaches the pressure in the tire cavity. Such a pressure balance results in the closure of the check valve 64 as depicted in FIG. 7.

The movement of the body 40 may depend on the mechanical forces it is subjected to. The forces involved may be created by the spring 76, the damping plates 78 and of course by present pressure differences. A first pressure difference may occur between the atmospheric pressure and the tire pressure, and acts on the surface of the bottom of the inlet chamber 44. This first pressure difference tends to maintain the body 40 in the intake state. A second pressure difference may occur between the hydraulic fluid in the blind hole and the tire pressure and acts on the surface of the bottom of the blind hole 46. This second pressure difference is intended to move the body 40 toward the compression state. A third pressure difference may occur between the pressure in the compression chamber 42 and the tire cavity pressure and acts on the surface of the bottom of the compression chamber 42 and is opposed to the movement of the body 40 toward the compression chamber 42.

It is noteworthy that if the tire pressure in the tire cavity is sufficient or reaches a defined value, it may counterbalance the provided hydraulic fluid pressure. Then, it maintains the body 40 in the intake state. This means that if the tire cavity pressure is sufficient, for instance above a defined threshold value, the compressor 14 does not reciprocate and avoids wear of contact surfaces, as for instance between the body 40 and the support 32. Thus, the compressor 14 may regulate the tire pressure, and may for example reduce clogging of an air inlet, and, in particular, of a filter associated with the air inlet, since less fluid has to pass through such a filter.

Figure 8:
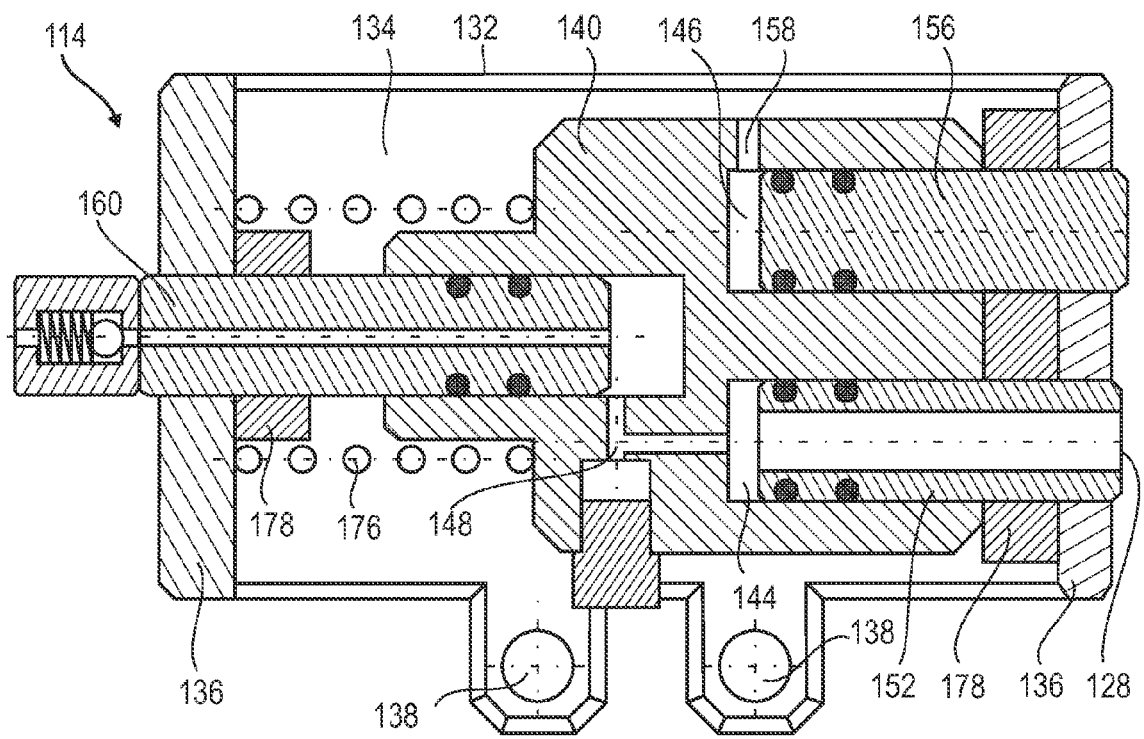
FIG. 8 is a cross sectional view of another embodiment of a compressor according to the invention, the compressor being in an intake state.

FIG. 8 represents a compressor 114 according to a further embodiment of the invention, wherein the compressor 114 is shown in an intake state. The main components or elements of the compressor 114 are similar or equal to that of the compressor 14 described in accordance with the preceding embodiment. Thus, the compressor 114 comprises a support 132, an elongated plate 134, a body 140, two opposing plates 136, mounting holes 138, damping plates 178, a compression piston 160, a blind hole 146, a fluid passageway 148, an inlet chamber 144, a pipe 152, and an inlet 128. The function of these elements is equal to that described above with respect to the embodiment according to FIGS. 3 to 7.

In the embodiment of FIG. 8, the guiding piston 156 does not comprise any passageway or channel. It may be a solid block having a rod-like shape. In contrast, a hydraulic fluid passage 158 is formed within the body 140. The hydraulic fluid passage 158 may be connected to a hose (not shown), which may be further connected to a hydraulic actuator (not shown) for providing hydraulic fluid or hydraulic fluid pressure. In particular, the fluid passage 158 passes from a sidewall of the blind hole 146 or a bottom of the blind hole 146 through the body 140 to a surface of the body 140. Then, the body 140 and the guiding piston 156 act as a hydraulic ram that can reciprocate the body 140 relative to the support 132.

Figure 9:
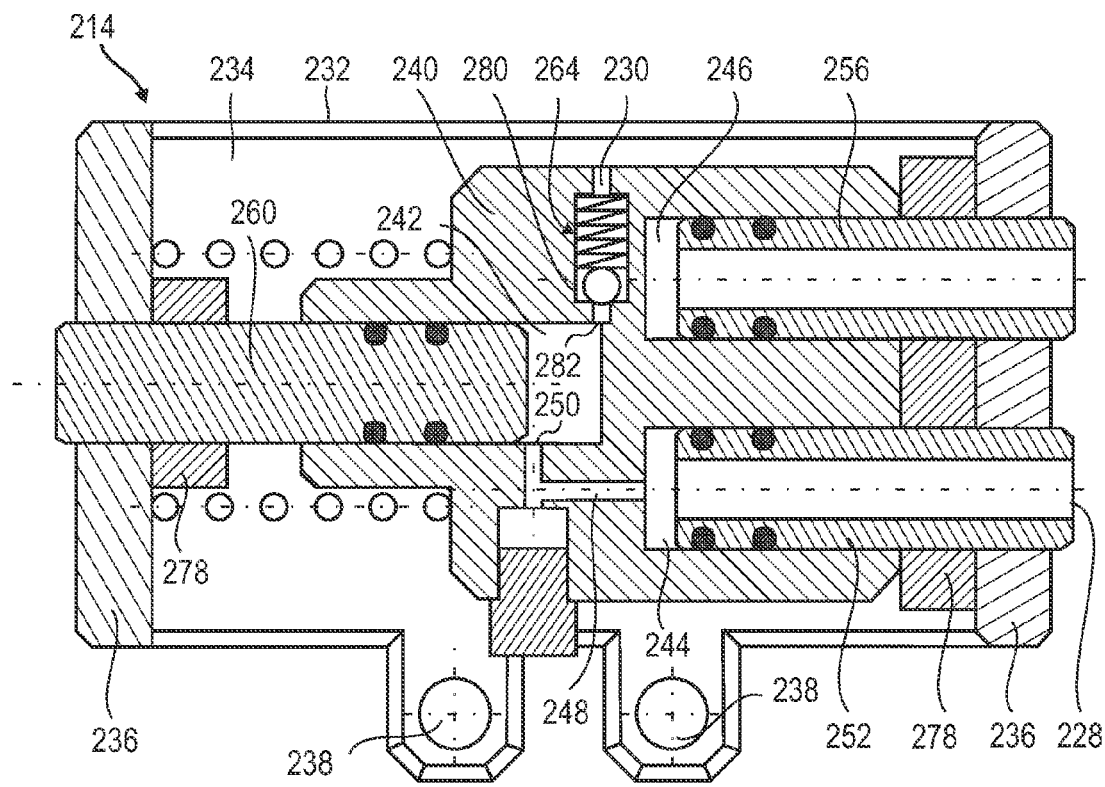
FIG. 9 is a cross sectional view of the compressor according to the embodiment of FIG. 8, the compressor being in an intake state.

FIG. 9 represents a compressor 214 according to a third embodiment of the invention, wherein the compressor 214 is represented in an intake state. The main components or elements of the compressor 214 are similar or equal to that of the compressors 14, 114 described in accordance with the preceding embodiments. Thus, the compressor 214 comprises a support 232, an elongated plate 234, a body 240, two opposing plates 236, mounting holes 238, damping plates 278, a compression piston 260, a compression chamber 242, an aperture 250, a blind hole 246, a guiding piston 256, a blind hole 246, a fluid passageway 248, an inlet chamber 244, a pipe 252, and an inlet 228.

In this third embodiment, the compression piston 260 forms a solid block or bar similar to the guiding piston 156 according to FIG. 8. In particular, the compression piston 260 does not allow any through flow and seals the compression chamber 242. The body 240 comprises a channel 280 for fluid communication between the compression chamber 242 and the annular tire cavity. The channel 280 is formed in the body 240 and forms or is connected to an air outlet 230 of the compressor 214.

The body 240 and/or the air outlet 230 may comprise a check valve 264 in fluid communication with the channel 280. The check valve 264 may be disposed within the body 240, or may be fixed to the body 240. Further, the check valve 264 may be connected to the channel 280. The channel 280 may form an aperture 282 in the compression chamber 242, wherein the aperture 282 is disposed closer to the bottom of the compression chamber 242 than the aperture 250 which is in fluid communication with the air inlet 228. Thus, when the body 240 moves from the intake state toward the compression state, the compression piston 260 first closes the aperture 250 and reaches afterwards the aperture 282. This means that the compression piston 260 blocks first the communication with the inlet chamber 244 to compress air in the compression chamber 242, and expels then compressed air into the tire cavity through the aperture 282 and the channel 280 via the check valve 264.

In a further non-depicted embodiment of the invention, the embodiment according to FIG. 8 and the embodiment according to FIG. 9 are combined. In this case, the body may comprise a hydraulic fluid passage in fluid communication with the blind hole and a duct in fluid communication with the compression chamber. At least one of the compression piston and the guiding piston may be a solid rod.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case, the above described embodiments shall not be understood in a limiting sense. In particular, the features of the above embodiments may also be replaced by or combined with one another.

The invention claimed is:

1. A compressor mountable in an annular tire cavity, the compressor comprising:
   an air inlet;
   an air outlet;
   a body in which are formed a blind hole having a sidewall, and a compression chamber in fluid communication with the air inlet and the air outlet;
   a compression piston configured for reciprocating in the compression chamber for providing compressed air to the tire cavity through the air outlet;
   a hydraulic fluid passage for providing hydraulic fluid into the blind hole; and
   a guiding piston configured for reciprocating in the blind hole in sealed contact with the sidewall and for guiding a reciprocating movement of the body relative to the compression piston.

2. The compressor according to claim 1, wherein the body comprises a wall tightly separating the compression chamber and the blind hole.

3. The compressor according to claim 1, wherein the compression piston and the guiding piston extend in parallel directions such that the body is moved relatively and in parallel to the compression piston and the guiding piston upon actuation by hydraulic fluid pressure provided to the blind hole.

4. The compressor according to claim 1, wherein the compression piston and the guiding piston are rigidly fixed relative to each other, and wherein the body moves relatively to the compression piston and the guiding piston.

5. The compressor according to claim 4, wherein the compressor comprises a support to be mounted to the tire, the compression piston and the guiding piston being rigidly fixed to the support and the body being moveable in relation to the support.

6. The compressor according to claim 4, wherein the compression piston may extend in the compression chamber along a longer portion than the guiding piston may extend in the blind hole.

7. The compressor according to claim 1, wherein the body is arranged and configured to move between a compression state and an intake state relative to the compression piston.

8. The compressor according to claim 7, wherein the compressor comprises two damping plates disposed at opposing faces of the body to damp the body abutting the support when reciprocating between the compression state and the intake state.

9. The compressor according to claim 1, wherein the compression piston and the guiding piston are movable along two different parallel axes offset from each other.

10. The compressor according to claim 1, wherein the body comprises an inlet chamber, and a pipe in fluid communication with the air inlet and configured for reciprocating in the inlet chamber.

11. The compressor according to claim 10, wherein the pipe has an elongated shape, elongated in parallel to the direction of reciprocating movement of the guiding piston and of the compression piston, and two opposed ends, and wherein the pipe comprises a through hole connecting both ends.

12. The compressor according to claim 10, wherein the inlet chamber and the compression chamber are in fluid communication through a passageway.

13. The compressor according to claim 12, wherein the compression chamber has a shape of a bore comprising a bottom, a sidewall and an opening, and wherein the passageway forms an aperture in the sidewall.

14. The compressor according to claim 12, wherein in the decompression state, the passageway is in fluid communication with the compression chamber, and in the compression state the compression piston blocks fluid communication between the passageway and the compression chamber.

15. The compressor according to claim 1, wherein the compression piston has two opposing faces and a through hole connecting both faces, and comprises a check valve in fluid communication with the through hole, the check valve allowing air to exit the compression chamber and blocking air to enter the compression chamber via the through hole.

16. The compressor according to claim 15, wherein the volume of the through hole of the compression piston is inferior to one of:
   the half of the maximal free volume available in the compression chamber during the reciprocating movement of the compression piston; or
   ten percent of the maximal free volume available in the compression chamber during the reciprocating movement of the compression piston.

17. The compressor according to claim 1, wherein the compressor comprises a spring opposing a compression movement of the compression piston in the compression chamber.

18. The compressor according to claim 1, wherein the hydraulic fluid passage is formed in the guiding piston and fluidly connects two axially opposite faces of the guiding piston.

19. The compressor according to claim 1, wherein the hydraulic fluid passage is formed in the body.

20. A tire assembly comprising a pneumatic tire having a tire cavity and a compressor according to claim 1.

21. The tire assembly according to claim 20, wherein the tire assembly comprises a hydraulic actuator in fluid communication with the blind hole via the hydraulic fluid passage.

22. The tire assembly according to claim 20, wherein the tire comprises a sidewall, and wherein the compressor is mounted inside the tire cavity on the sidewall.

* * * * *